(12) United States Patent
Netsell et al.

(10) Patent No.: US 8,094,748 B2
(45) Date of Patent: Jan. 10, 2012

(54) TRANSCEIVER ARCHITECTURE WITH COMBINED SMART ANTENNA CALIBRATION AND DIGITAL PREDISTORTION

(75) Inventors: Aaron W. Netsell, Woodstock, IL (US); Matthew V. Clark, Algonquin, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 766 days.

(21) Appl. No.: 12/172,381

(22) Filed: Jul. 14, 2008

(65) Prior Publication Data

US 2010/0008446 A1 Jan. 14, 2010

(51) Int. Cl.
*H04K 1/02* (2006.01)
*H04L 25/03* (2006.01)
*H04L 25/49* (2006.01)

(52) U.S. Cl. ........................................................ 375/296

(58) Field of Classification Search .......... 375/295–296, 375/219, 285, 224
See application file for complete search history.

(56) References Cited

U.S. PATENT DOCUMENTS

| | | | | |
|---|---|---|---|---|
| 5,630,223 A * | 5/1997 | Bahu et al. | | 455/296 |
| 7,065,330 B2 * | 6/2006 | Klingberg et al. | | 455/126 |
| 7,280,848 B2 * | 10/2007 | Hoppenstein | | 455/561 |
| 7,469,013 B1 * | 12/2008 | Bolt et al. | | 375/260 |
| 7,907,916 B2 * | 3/2011 | Cole et al. | | 455/73 |
| 2005/0201483 A1 | 9/2005 | Coersmeier | | |
| 2007/0149251 A1 * | 6/2007 | Jeon | | 455/562.1 |

FOREIGN PATENT DOCUMENTS

WO 0243260 A1 5/2002

* cited by examiner

*Primary Examiner* — Jean B Corrielus

(57) ABSTRACT

A method, apparatus, and electronic device for using digital predistortion are disclosed. A first transmitter 212 may send a first signal. A second transmitter 212 may send a second signal. A multipurpose calibration transceiver 902 may execute a first distortion observation of the first signal to be a basis for a first digital predistortion on the first signal and execute a second distortion observation of the second signal to be a basis for a second digital predistortion on the second signal. The multipurpose calibration transceiver may execute a first calibration observation of the first signal and a second calibration observation of the second signal to calibrate the first transmitter and the second transmitter.

18 Claims, 11 Drawing Sheets

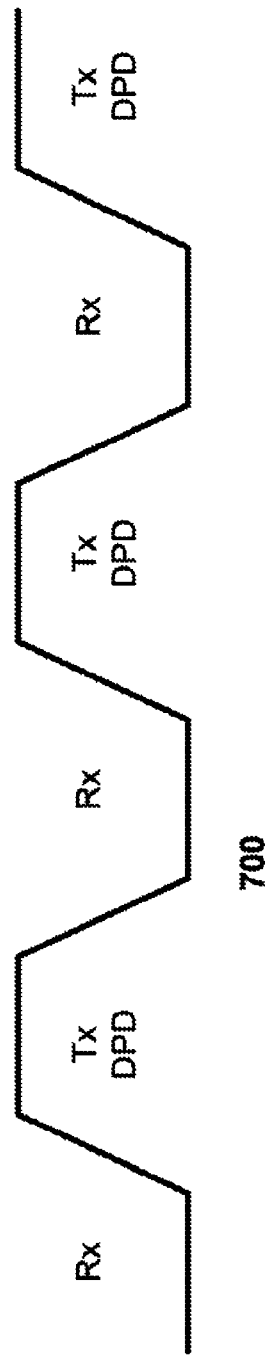
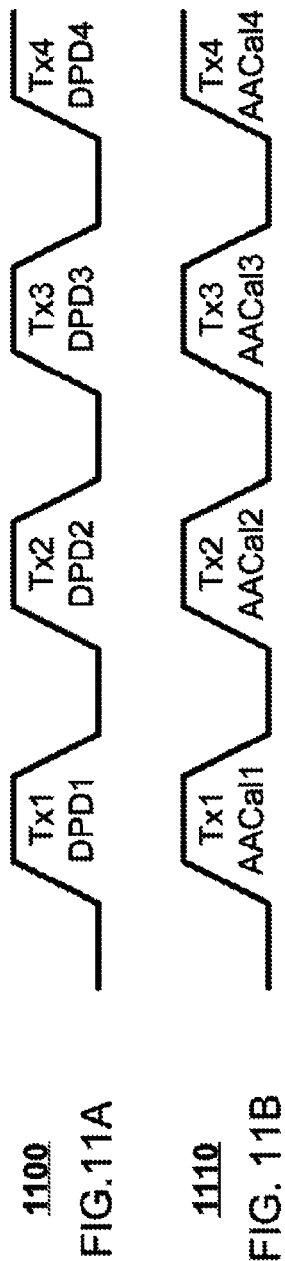

US 8,094,748 B2

TRANSCEIVER ARCHITECTURE WITH COMBINED SMART ANTENNA CALIBRATION AND DIGITAL PREDISTORTION

FIELD OF THE INVENTION

The present invention relates to a method and system for using a smart antenna array. The present invention further relates to using digital predistortion with a smart antenna array.

INTRODUCTION

High speed wireless internet access systems such as WiMAX® may have high peak-to-average signals, creating a need in access point transmitters for high linearity. A transmitter may achieve this high linearity by employing some type of adaptive linearization scheme, such as digital predistortion (DPD). Applying DPD to a WiMAX® or other time division duplexing system may involve the use of an observation receiver during the transmit portion of the burst to monitor the signal. The monitored transmitter signal may be compared to the original transmitter signal and the next transmitted signal may be adjusted appropriately to account for distortion caused by power amplifiers in the transmitter circuit.

In addition, WiMAX® may employ a smart antenna scheme, or adaptive antenna scheme, that combines signals from multiple transmitters and receivers in intelligent ways to improve link budgets. The smart antenna array may use an adaptive antenna calibration (AAcal) transceiver to account for differences in transmit and receive paths across multiple transmitters.

SUMMARY OF THE INVENTION

A method, apparatus, and electronic device for using digital predistortion are disclosed. A first transmitter may send a first signal. A second transmitter may send a second signal. A multipurpose calibration transceiver may execute a first distortion observation of the first signal to be a basis for a first digital predistortion on the first signal and execute a second distortion observation of the second signal to be a basis for a second digital predistortion on the second signal. The multipurpose calibration transceiver may execute a first calibration observation of the first signal and a second calibration observation of the second signal to calibrate the first transmitter and the second transmitter.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 7 illustrates in a timing diagram one embodiment of a transmitting and receiving schedule for a transceiver.

FIGS. 11*a-b* illustrate in timing diagrams one embodiment of a receiving schedule for the multipurpose calibration transceiver to measure distortion.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, apparatus, and electronic device for using digital predistortion are disclosed. A first transmitter may send a first signal. A second transmitter may send a second signal. A multipurpose calibration transceiver may execute a first distortion observation of the first signal to be a basis for a first digital predistortion on the first signal and execute a second distortion observation of the second signal to be a basis for a second digital predistortion on the second signal. The multipurpose calibration transceiver may execute a first calibration observation of the first signal and a second calibration observation of the second signal to calibrate the first transmitter and the second transmitter.

Figure 1:
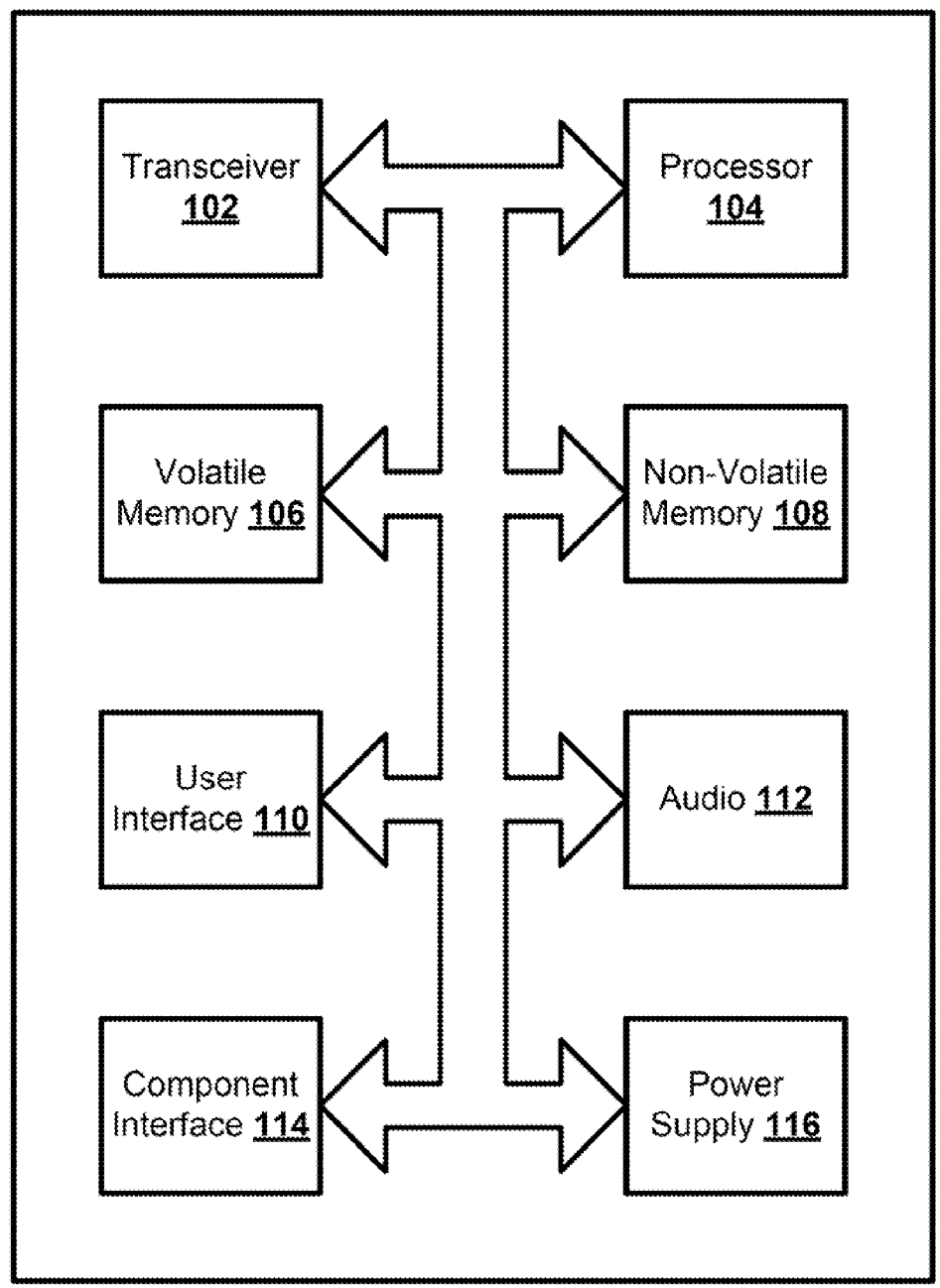
FIG. 1 illustrates in a block diagram one embodiment of a computing device that may transmit data signals in a high speed wireless internet access system.

FIG. 1 illustrates in a block diagram one embodiment of a computing device 100 that may transmit data signals in a high speed wireless internet access system. Any computing device, such as a desktop computer, handheld device, or a server, may implement this high-speed data signal transceiver. The computing device 100 may access the information or data stored in a network. The computing device 100 may support one or more applications for performing various communications with the network. The computing device 100 may implement any operating system, such as Windows or UNIX, for example. Client and server software may be written in any programming language, such as C, C++, Java or Visual Basic, for example. The computing device 100 may be a mobile phone, a laptop, a personal digital assistant (PDA), or other portable device. The computing device 100 may also reside in a network infrastructure device such as an access point or base station. For some embodiments of the present invention, the computing device 100 may be a WiFi capable device, which may be used to access the network for data or voice by using voice over internet protocol (VOIP). The computing device 100 may include a network interface 102, such as a transceiver, to send and receive data over the network.

The computing device 100 may include a controller or processor 104 that executes stored programs. The controller or processor 104 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The computing device 100 may also include a volatile memory 106 and a non-volatile memory 108 to be used by the processor 104. The volatile 106 and nonvolatile data storage 108 may include one or more electrical, magnetic or optical memories such as a random access memory (RAM), cache, hard drive, or other memory device. The memory may have a cache to speed access to specific data. The memory may also be connected to a compact disc-read only memory (CD-ROM), digital video disc-read only memory (DVD-ROM), DVD read write input, tape drive or other removable memory device that allows media content to be directly uploaded into the system.

The computing device 100 may include a user input interface 110 that may comprise elements such as a keypad, display, touch screen, or any other device that accepts input. The computing device 100 may also include a user output device that may comprise a display screen and an audio interface 112 that may comprise elements such as a microphone, earphone, and speaker. The computing device 100 also may include a component interface 114 to which additional elements may be attached, for example, a universal serial bus (USB) interface or an audio-video capture mechanism. Finally, the computing device 100 may include a power supply 116.

Client software and databases may be accessed by the controller or processor 104 from the memory, and may include, for example, database applications, word processing applications, video processing applications as well as components that embody the decision support functionality of the present invention. The user access data may be stored in either a database accessible through a database interface or in the memory. The computing device 100 may implement any operating system, such as Windows or UNIX, for example. Client and server software may be written in any programming language, such as C, C++, Java or Visual Basic, for example.

Figure 2:
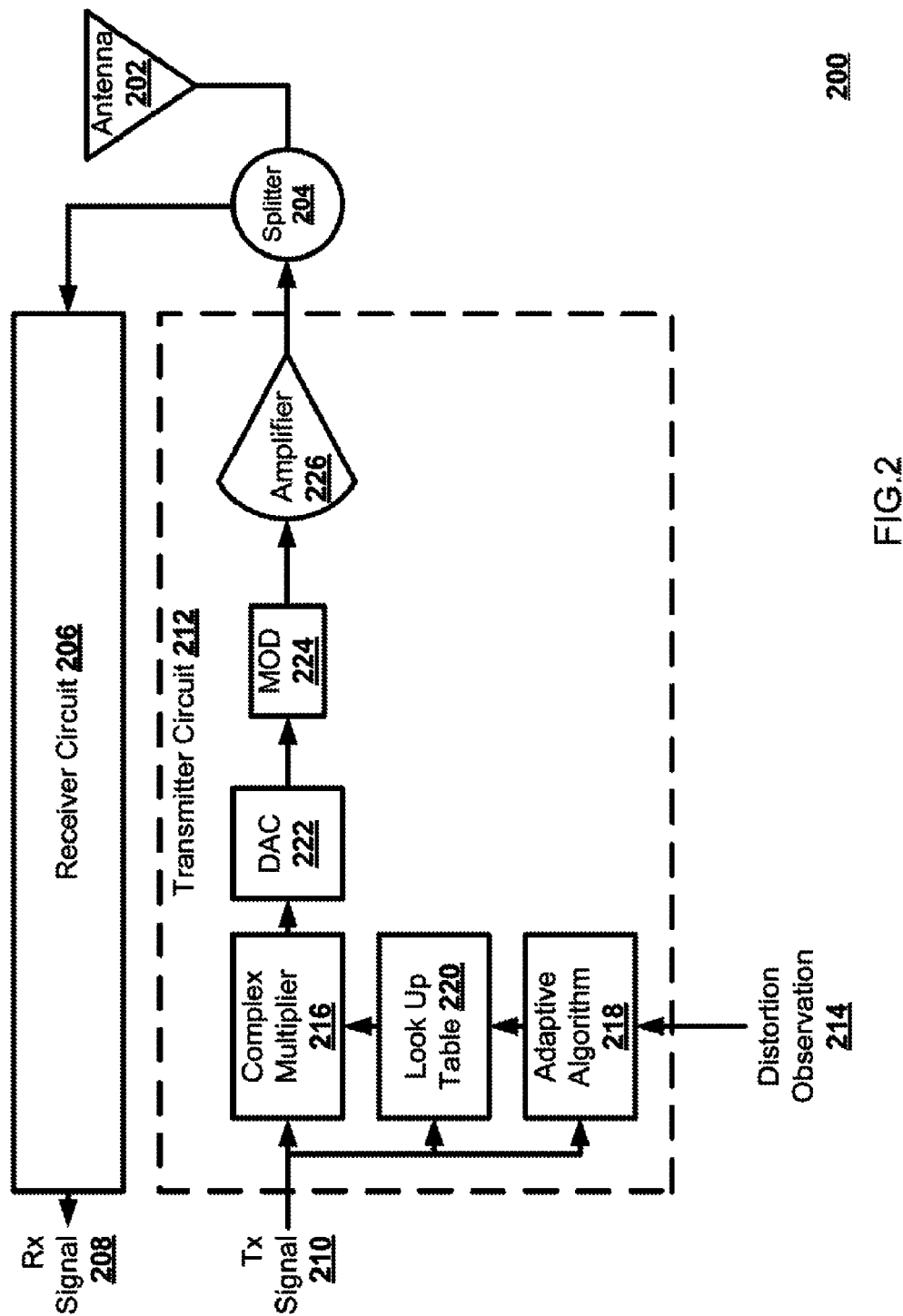
FIG. 2 illustrates in a block diagram one embodiment of a simplified transceiver executing digital predistortion.

The transceiver 102 may improve the fidelity of a transmission signal using an adaptive linearization scheme, such as digital predistortion (DPD). In digital predistortion, a signal may be predistorted before being sent through the transmitter circuit in a way that distortions of the transmitter circuit result in a corrected signal. FIG. 2 illustrates in a block diagram one embodiment of a simplified transceiver 102 executing DPD. The transceiver 102 may receive a signal on an antenna array 202, which may be passed through a splitter 204 to a receiver circuit 206. The receiver circuit 206 may demodulate and amplify the receiver (Rx) signal 208 before passing the Rx signal 208 on to be translated, presented, or stored. The processor 104 may send a transmitter (Tx) signal 210 to a transmitter circuit 212 to be modulated and amplified before being sent to the smart antenna array 202 via the splitter 204. The amount of distortion to the Tx signal 210 created by the transmitter circuit 212, by the power amplifiers or other circuit components, may be measured and observed. The distortion observation 214 may be fed back into the transmitter circuit 212, so that the Tx signal 210 may be predistorted to eliminate distortion caused by the transmitter circuit 212. The transmitter circuit may use any one of a number of digital predistortion techniques, not limited to just the technique shown.

The transmitter circuit 212 may use a complex multiplier 216 to multiply the Tx signal 210 by a series of complex coefficients to create a predistorted signal. An adaptive algorithm block 218 may look up the complex coefficients in a look up table 220 using a comparison between the Tx signal 210 and the distortion observation 214. A digital to analog converter (DAC) 222 may convert the predistorted Tx signal 210 from a digital signal to an analog signal. A modulator (MOD) 224 may modulate the Tx signal 210 for transmission. An amplifier 226 may amplify the power of the Tx signal 210 for transmission.

Figure 3:
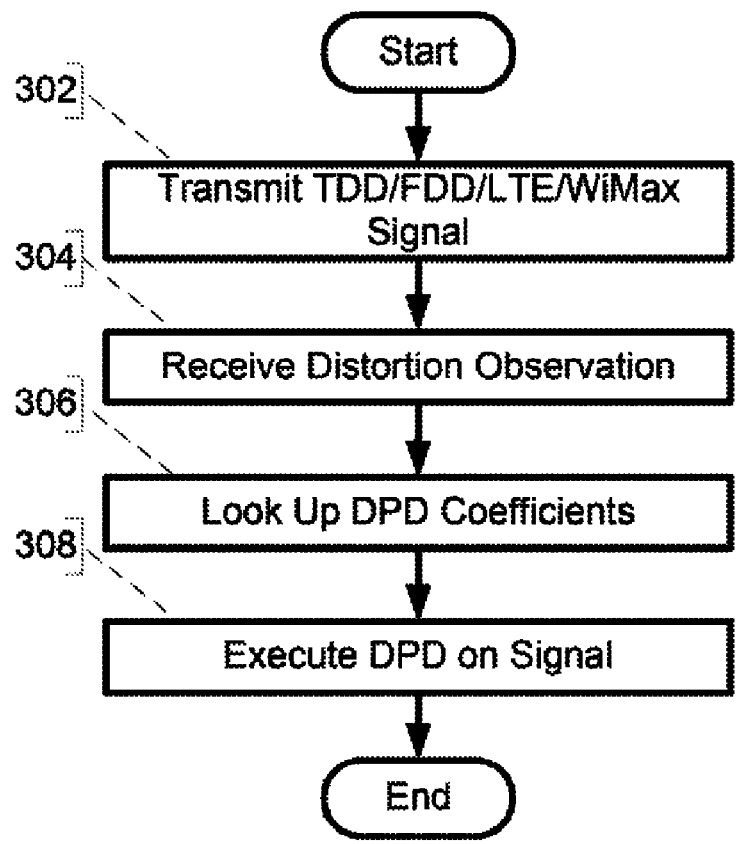
FIG. 3 illustrates in a flow chart one embodiment of a method for a transmitter circuit to digitally predistort a transmitter signal.

FIG. 3 illustrates in a flow chart one embodiment of a method 300 for a transmitter circuit 212 to digitally predistort a Tx signal 210. The transmitter circuit 212 may transmit a Tx signal (Block 302). The transmitter circuit 212 may transmit the Tx signal 210 using time division duplexing (TDD) or frequency division duplexing (FDD). Time division duplexing may timeshare an outward signal and a return signal using a single channel. Frequency division duplexing may use two different frequency channels, one for the outward signal and one for the return signal. The transmitter circuit 212 may transmit the Tx signal 210 following the Third Generation Partnership Project (3GPP) Long Term Evolution (LTE) standard or a WiMax® standard. The transmitter circuit 212 may receive a distortion observation 214 of the Tx signal 210 just before the smart antenna array 202 (Block 304). The transmitter circuit 212 may receive the distortion observation 214 from a feedback loop, the receiver circuit 206, or from another source. The transmitter circuit 212 may use the distortion observation 214 to look up one or more DPD coefficients (Block 306). The transmitter circuit 212 may then execute DPD on the Tx signal 210 (Block 308).

Figure 4:
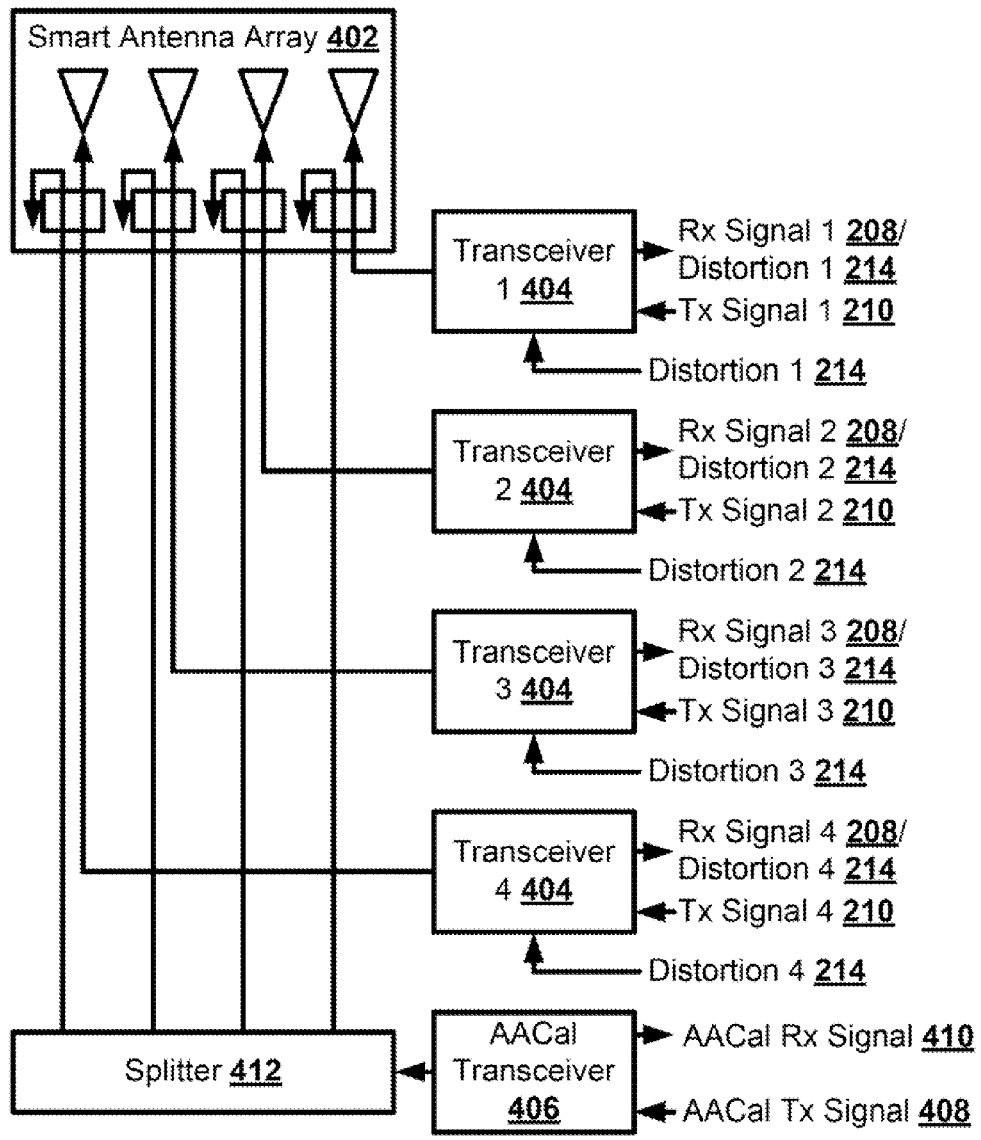
FIG. 4 illustrates in a block diagram one embodiment of a standard smart antenna system that may implement digital predistortion.

A smart antenna system may use multiple antenna elements to more efficiently transmit and receive data signals. FIG. 4 illustrates in a block diagram one embodiment of a standard smart antenna system 400 that may implement DPD. While the smart antenna array 402 of the embodiment shown has four antenna elements, a smart antenna array 402 may have any number of antenna elements. Each antenna element of the smart antenna array 402 may be connected to a transceiver 404. The transceiver 404 may receive a Tx signal 210 from the telecommunication system 100 to be transmitted by the smart antenna array 402. The transceiver 404 may execute DPD on the Tx signal 210 based upon a distortion observation 214. The transceiver 404 may receive a signal from the smart antenna array 402 and translate that into a Rx signal 208. The transceiver 404 may create a distortion observation 214 based upon the signal being sent to the smart antenna array 402.

The smart antenna array 402 in conjunction with computing system 100 may use an adaptive antenna calibration (AACal) transceiver 406 to calibrate gain and phase differences for each of the main transceivers transmit and receive paths. The AACal transceiver 406 calibrates each transceiver 404 on a slow moving but regular interval. The system 100 may send an AACal Tx signal 408 to the smart antenna array 402. The calibration signal may then be received by each of the transceivers 404 to be translated, amplified, and forwarded as an AACal Rx signal 410 to the telecommunication system 100. In an alternate embodiment, the system 100 may instruct each transceiver 404 to sequentially transmit an AACal Tx signal 408 as Tx signal 210 to the smart antenna array 402. The calibration signal may then be received by the AAcal transceiver 406 to be translated, amplified, and forwarded as an AACal Rx signal 410 to the telecommunication system 100. The AACal transceiver 406 may use a splitter 412 to connect with each antenna element of the smart antenna array 402.

Figure 5:
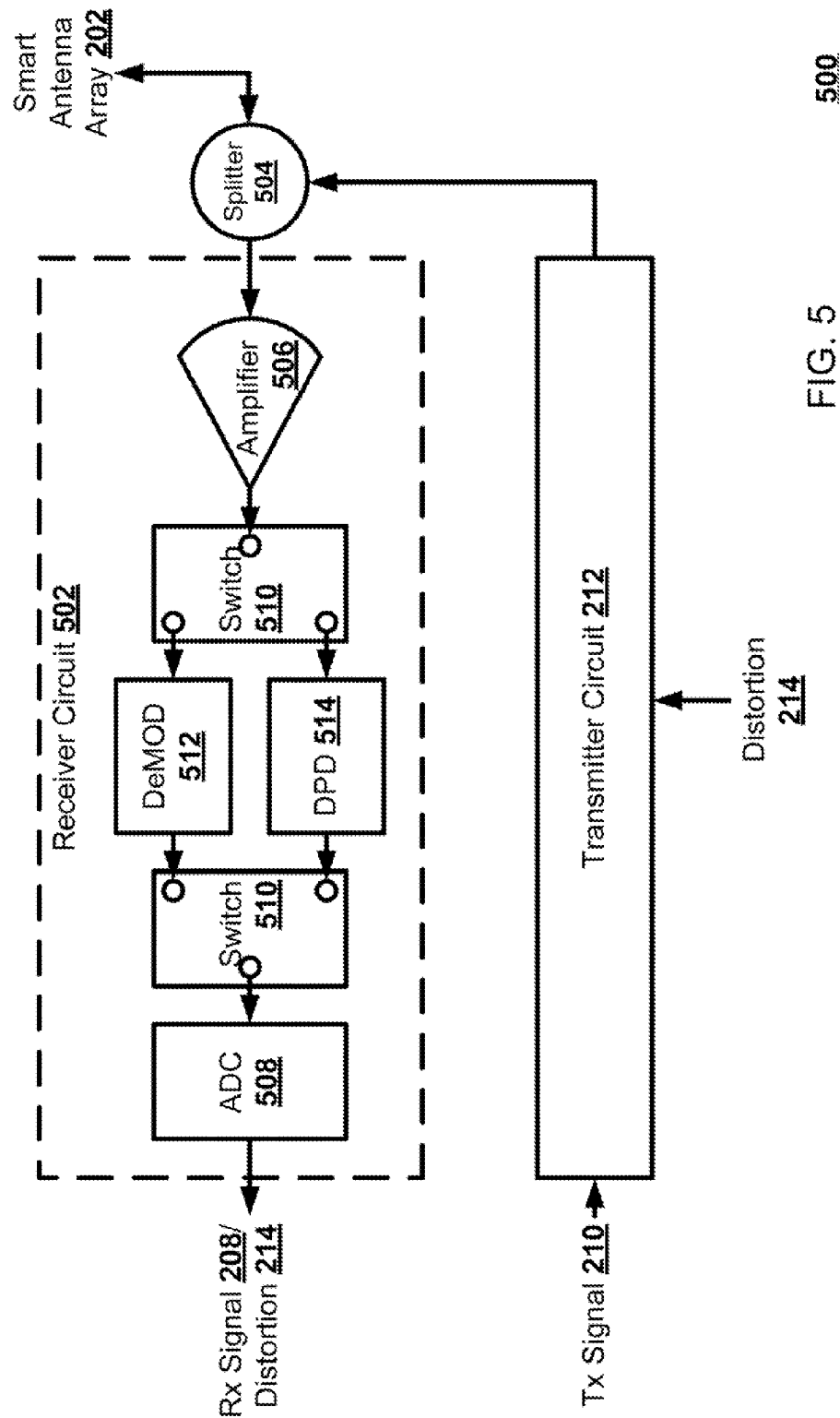
FIG. 5 illustrates in a block diagram one embodiment of the transceiver.

FIG. 5 illustrates in a block diagram one embodiment of the transceiver 404. The transceiver 404 may have a receiver circuit 502 and a transmitter circuit 212. The transceiver 404 may use a splitter 504 to connect the smart antenna array 402 to the receiver circuit 502 and the transmitter circuit 212. The splitter 504 may forward a signal received from the smart antenna array 402 to the receiver circuit 502, which amplifies, demodulates, and converts the signal before forwarding the Rx signal 208 to the telecommunications system 100. The transmitter circuit 212 may amplify, modulate, and convert a Tx signal 210 received from the telecommunication system 100. The transmitter circuit 212 may also execute a DPD of the Tx signal 210 based upon a distortion observation 214. The splitter 504 may forward a modulated and amplified analog transmitter signal to the smart antenna array 402 and the receiver circuit 502.

Each receiver circuit 502 may function as an observation receiver for the transmitter circuit 212 for DPD during the transmit portion of a TDD frame. The splitter 504 may switch a portion of the transmit signal into the receiver circuit during the transmit time. The receiver circuit 502 may switch each receiver's path to a wide bandwidth with no intermediate filter and a high third-order intercept point (IP3) path, resulting in additional circuitry in each receiver, such as switches, amplifiers, passives. The receiver circuit 502 may have an amplifier 506 to amplify the signal and an analog to digital converter (ADC) to convert 508 the signal. The receiver circuit 502 may use a set of switches 510 to alternate paths depending on whether the incoming signal is from the smart antenna array 402 or from the transmitter circuit 212. If the signal is from the smart antenna array 402 during a receive portion of a signal frame, the receiver circuit runs the signal through the demodulation circuit (DeMOD) 512 to determine the Rx signal 208. If the signal is from the transmitter circuit 212, the receiver circuit runs the signal through the DPD circuit 514 to determine the distortion observation 214.

Figure 6:
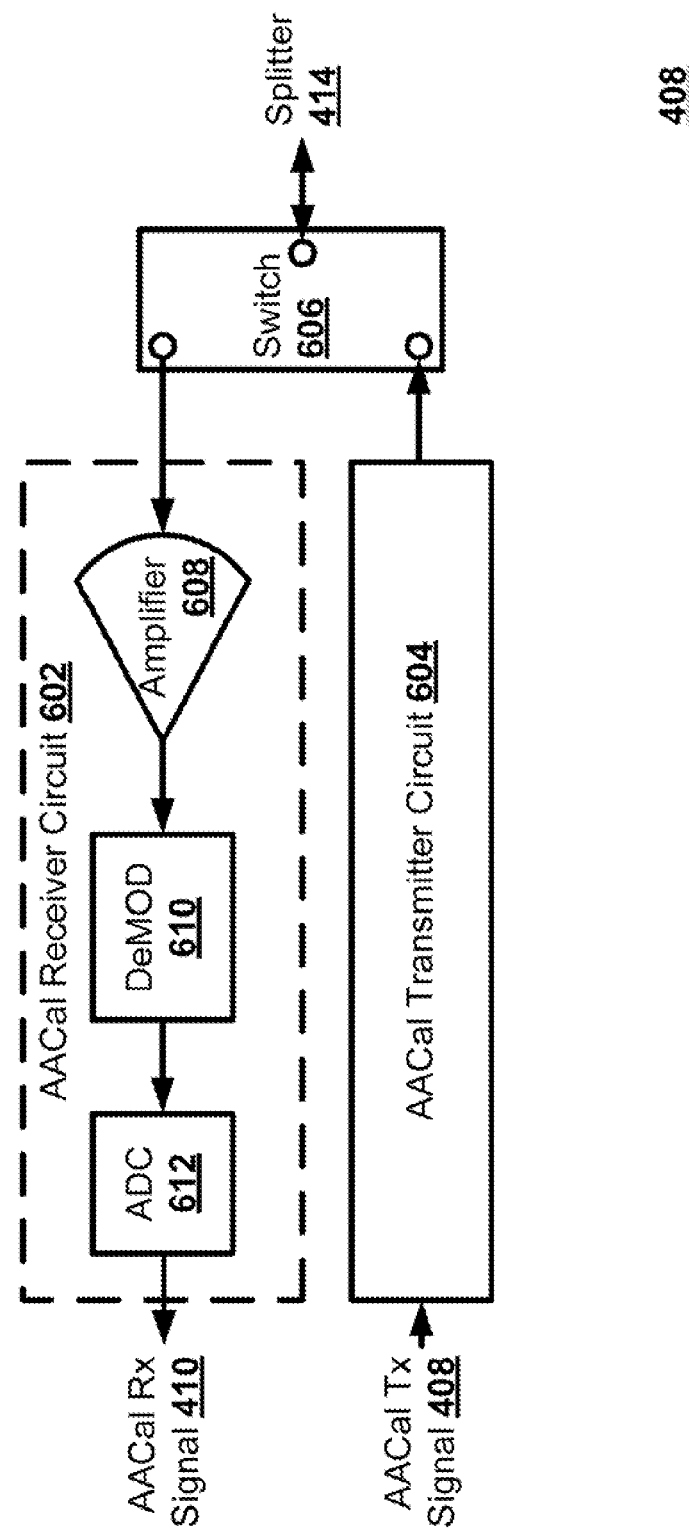
FIG. 6 illustrates in a block diagram one embodiment of the adaptive antenna calibration transceiver.

FIG. 6 illustrates in a block diagram one embodiment of the AACal transceiver 406. The AACal transceiver 406 may have an AACal receiver circuit 602 and an AACal transmitter circuit 604. The AACal transceiver 406 may use a switch 606 to connect the splitter 412 to the AACal receiver circuit 602 and the AACal transmitter circuit 604. The switch 606 may forward a calibration signal received from the splitter 412 to the AACal receiver circuit 602, which amplifies, demodulates, and converts the signal before forwarding the AACal Rx signal 410 to the telecommunications system 100. The AACal transmitter circuit 604 may amplify, modulate, and convert an AACal Tx signal 408 received from the telecommunication system 100. The switch 606 may forward the modulated and amplified digital calibration signal to the splitter 412 which forwards the signal on to the smart antenna array 402. The AACal receiver circuit 602 may have an amplifier 608 to amplify the signal; a DeMOD circuit 610 to demodulate the signal; and an ADC 612 to convert the signal to digital.

Each transceiver 404 may alternate between receiving a signal and both transmitting a signal and making a distortion observation for a TDD system. FIG. 7 illustrates in a timing diagram one embodiment of a transmitting and receiving schedule 700 for each transceiver 404. In a TDD system, the transceiver may alternate between transmission cycles and reception cycles. During a transmission cycle, while the transmitter circuit 212 is transmitting a signal, the receiving circuit 502 may perform a distortion observation of the transmitted signal in order to be able to perform DPD. During a reception cycle, the receiving circuit 502 may receive a signal from the smart antenna array 402.

Figure 8:
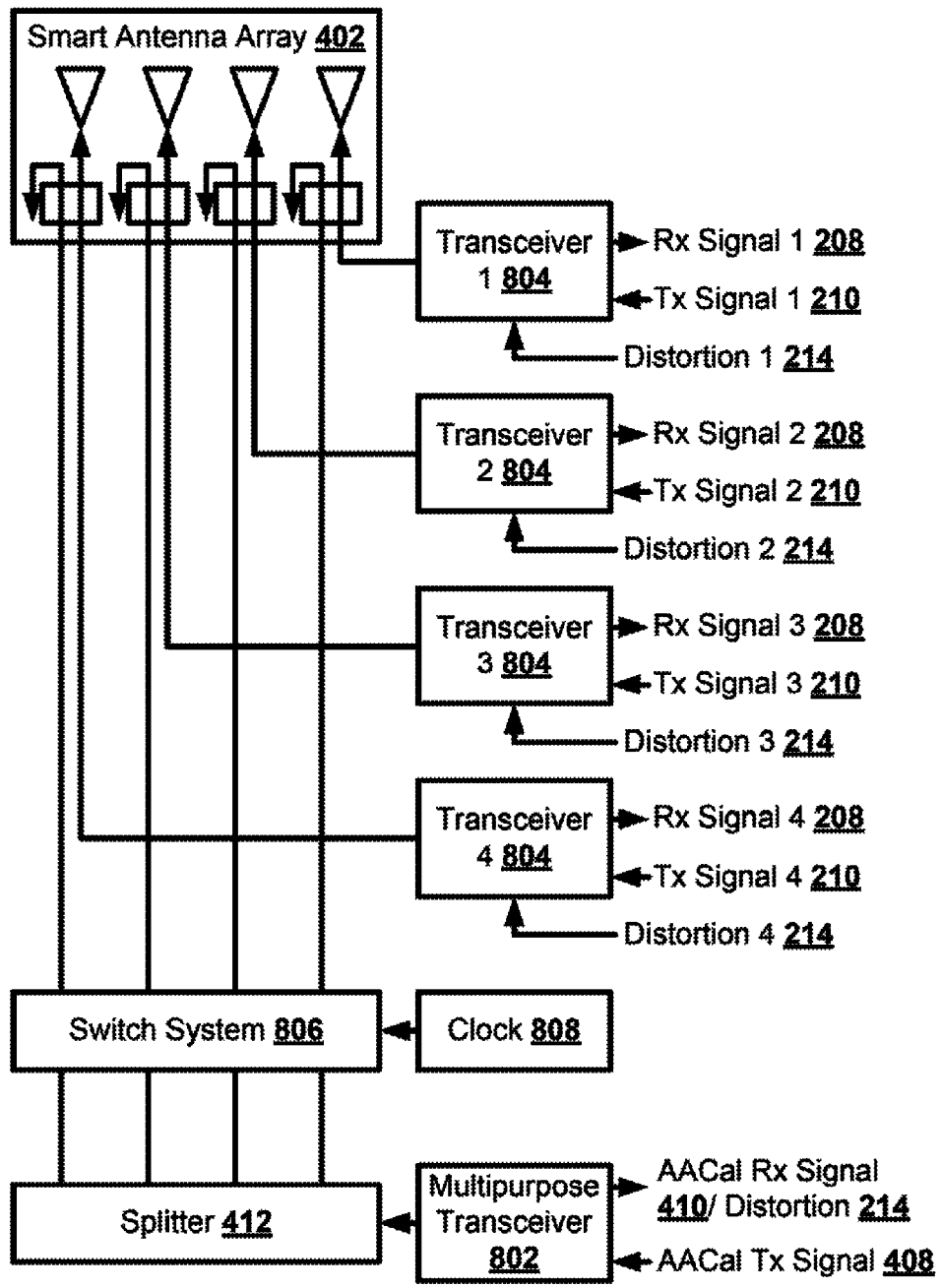
FIG. 8 illustrates in a block diagram one embodiment of a smart antenna system that may implement digital predistortion using a multipurpose calibration transceiver.

DPD is a slow moving process relative to a frame that may not require constant monitoring. One observation receiver may be used to make the distortion observation 214 for each transceiver 404, such as the receiver in the AACal transceiver 406. FIG. 8 illustrates in a block diagram one embodiment of a smart antenna system 800 that may implement DPD using a multipurpose calibration transceiver 802. While the smart antenna array 402 of the embodiment shown has four antenna elements, a smart antenna array 402 may have any number of antenna elements. Each antenna element of the smart antenna array 402 may be connected to a streamlined transceiver 804. The streamlined transceiver 804 may allow a greater number of transceivers 804 than previously used to be arranged in the smart antenna system 800, such as an eight transceiver 804 or sixteen transceiver 804 smart antenna system 800. The transceiver 804 may receive a Tx signal 210 from the telecommunication system 100 to be transmitted by the smart antenna array 402. The transceiver 804 may execute DPD on the Tx signal 210 based upon a distortion observation 214. The transceiver 804 may receive a signal from the smart antenna array 402 and translate that into a Rx signal 208.

The smart antenna array 402 may use a multipurpose calibration transceiver 802 to calibrate gain and phase differences for each of the main transceivers transmit and receive paths and to measure distortion on each transceiver 804 for purposes of applying digital predistortion. The multipurpose calibration transceiver 802 calibrates each transceiver 804 on a slow moving but regular interval. The system 100 may send an AACal Tx signal 408 as a Tx signal 210 sequentially through each transceiver 804 to the smart antenna array 402. The calibration signal may then be received by the multipurpose calibration transceiver 802 to be translated, amplified, and forwarded as an AACal Tx signal 408 to the telecommunication system 100. The system 100 may also send an AACal Tx signal 408 through the multipurpose calibration transceiver 802 to the smart antenna array 402. The calibration signal may then be received by each transceiver 804 to be translated, amplified, and forwarded as an AACal Rx signal 412 to the telecommunication system 100. The multipurpose calibration transceiver 802 may use a splitter 412 to connect with each antenna element of the smart antenna array 402. A switch system 806 may control which transceiver 804 is being observed to determine the amount of distortion on that transceiver 804. A clock system 808 may cycle the switch system 806 through each transceiver 804.

Figure 9:
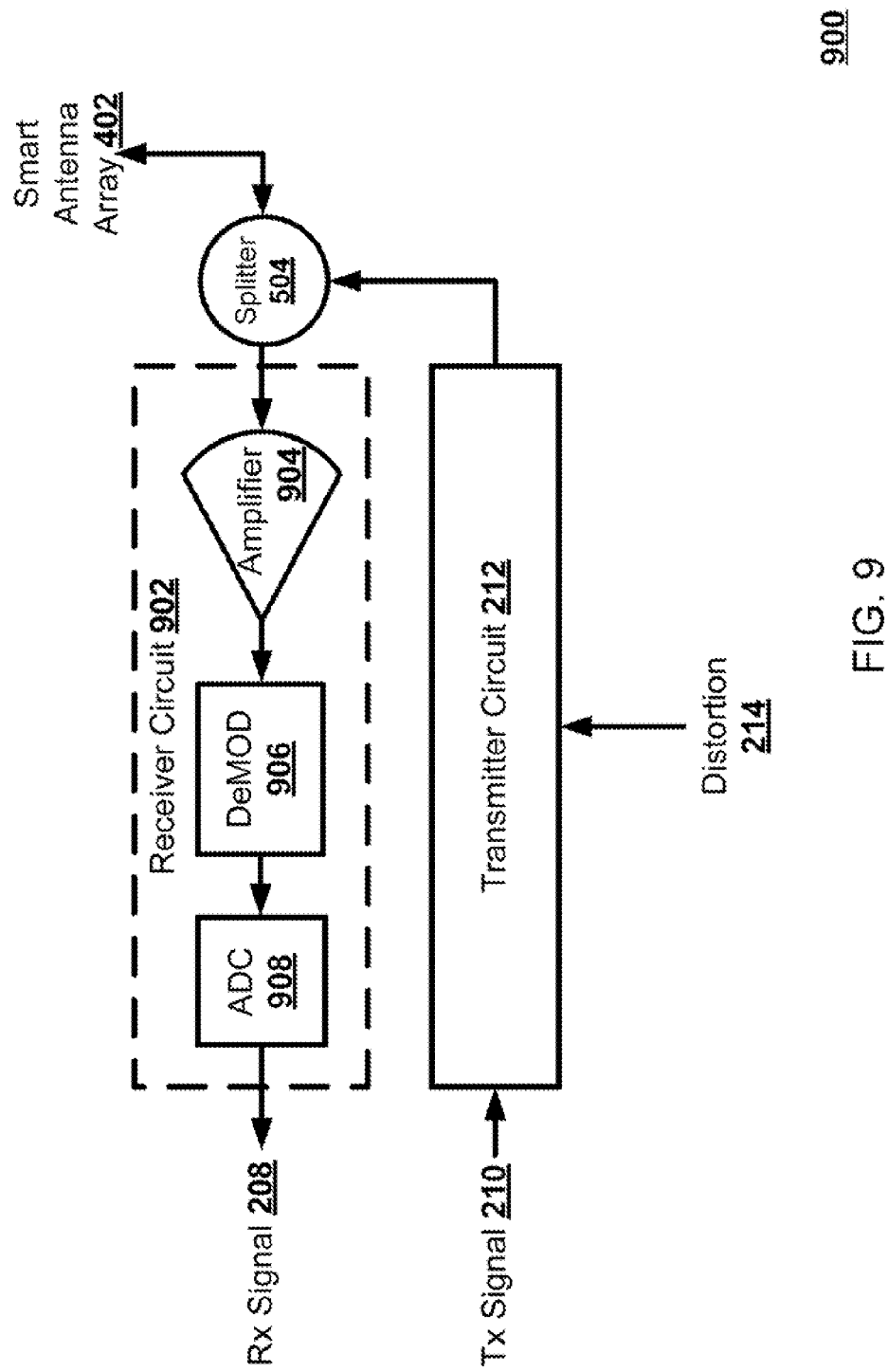
FIG. 9 illustrates in a block diagram one embodiment of the transceiver.

FIG. 9 illustrates in a block diagram one embodiment of the transceiver 804. The transceiver 804 may have a receiver circuit 902 and a transmitter circuit 212. The transceiver 804 may use a splitter 504 to connect the smart antenna array 402 to the receiver circuit 902 and the transmitter circuit 212. The splitter 504 may forward a signal received from the smart antenna array 402 to the receiver circuit 902, which amplifies, demodulates, and converts the signal before forwarding the Rx signal 208 to the telecommunications system 100. The transmitter circuit 212 may amplify, modulate, and convert a Tx signal 210 received from the telecommunication system 100. The transmitter circuit 212 may also execute a DPD of the Tx signal 210 based upon a distortion observation 214. The splitter 504 may forward a modulated and amplified analog transmitter signal to the smart antenna array 402. The receiver circuit 902 may have an amplifier 904 to amplify the signal; a DeMOD circuit 906 to calculate the Rx signal 208; and an ADC 908 to convert the signal to a digital signal.

Figure 10:
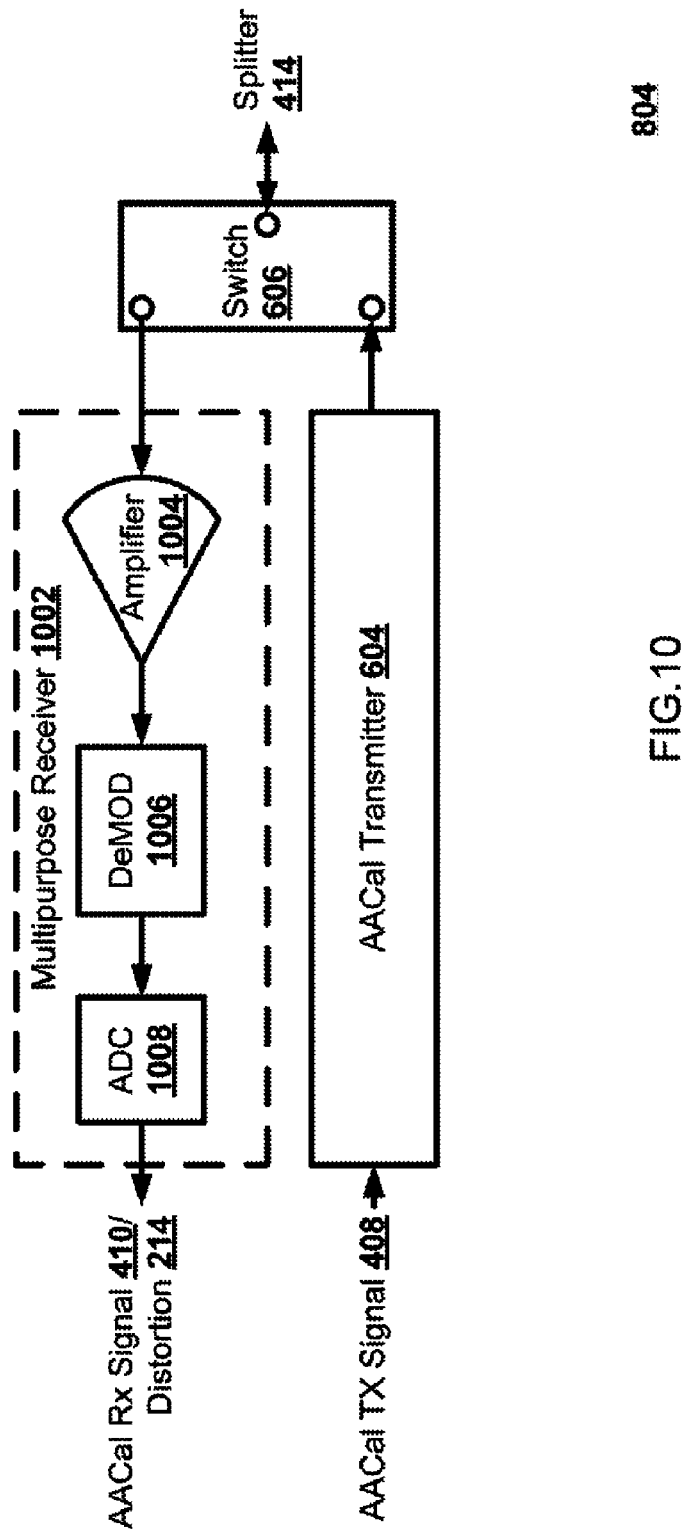
FIG. 10 illustrates in a block diagram one embodiment of the multipurpose calibration transceiver.

FIG. 10 illustrates in a block diagram one embodiment of the multipurpose calibration transceiver 802. The multipurpose calibration transceiver 802 may have a multipurpose calibration receiver circuit 1002 and an AACal transmitter circuit 604. The multipurpose calibration transceiver 802 may use a switch 606 to connect the splitter 412 to the multipurpose calibration receiver circuit 1002 and the AACal transmitter circuit 604. The switch 606 may forward a calibration signal received from the splitter 412 to the multipurpose calibration receiver circuit 1002, which amplifies, demodulates, and converts the signal before forwarding the AACal Rx signal 410 to the telecommunications system 100. The AACal transmitter circuit 604 may amplify, modulate, and convert an AACal Tx signal 408 received from the telecommunication system 100. The switch 606 may forward a modulated and amplified digital calibration signal to the splitter 412. The multipurpose calibration receiver circuits 1002 may have an amplifier 1004 to amplify the signal; a DeMOD circuit 1006 to demodulate the signal; and an ADC 1008 to convert the signal to digital. The multipurpose calibration receiver circuit 1002 may also monitor the transmission of a signal by a transceiver 804, and determine the distortion to create a distortion observation 214 for that transceiver.

The multipurpose calibration transceiver 802 may cycle through each transceiver 214, measuring the distortion or alternatively, receiving the AACal Tx signal 408 transmitted from each transceiver 804. FIG. 11a illustrates in a timing diagram one embodiment of a receiving schedule 1100 for the multipurpose calibration transceiver 802 to measure transmitter distortion. As each transceiver 804 transmits a signal, the multipurpose calibration antenna 802 may cycle through each transceiver 804 of the system to sample the transmitted signal to create a distortion observation to be sent to that transceiver 804 for performing DPD on that transmitted signal.

Further, when not performing distortion observations for DPD, the multipurpose calibration antenna may also calibrate the smart antenna array 402. FIG. 11b illustrates in a timing diagram one embodiment of a receiving schedule 1110 for the multipurpose calibration transceiver 802 to calibrate the smart antenna array 402. As each transceiver 804 transmits a signal, the multipurpose calibration antenna 802 may cycle through each transceiver 804 of the system to sample the transmitted signal to perform calibrations of that transceiver 804 in the antenna array 402.

Figure 12:
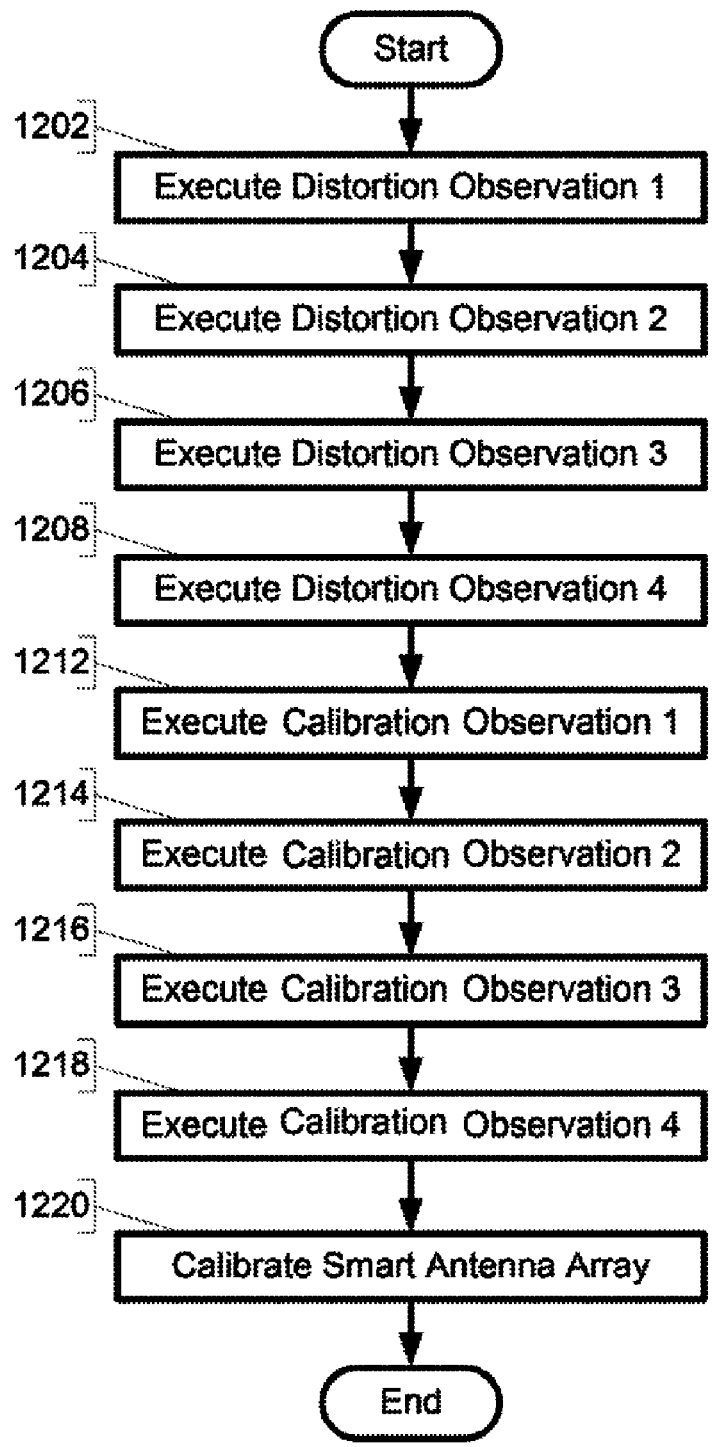
FIG. 12 illustrates in a flowchart one embodiment of method for the multipurpose calibration transceiver to measure distortion and calibrate the smart antenna array.

FIG. 12 illustrates in a flowchart one embodiment of method 1200 for the multipurpose calibration transceiver 802 to measure distortion and calibrate the smart antenna array 402. The multipurpose calibration transceiver 802 may execute a first distortion observation 214 of a first signal from a first transmitter circuit 212 (Block 1202). The multipurpose calibration transceiver 802 may execute a second distortion observation 214 of a second signal from a second transmitter circuit 212 (Block 1204). The multipurpose calibration transceiver 802 may execute a third distortion observation 214 of a third signal from a third transmitter (Tx) circuit 212 (Block 1206). The multipurpose calibration transceiver 802 may execute a fourth distortion observation 214 of a fourth signal from a fourth transmitter circuit 212 (Block 1208). The multipurpose calibration transceiver 802 may execute a first calibration observation 214 of the first signal (Block 1210). The multipurpose calibration transceiver 802 may execute a second calibration observation 214 of the second signal (Block 1212). The multipurpose calibration transceiver 802 may execute a third calibration observation 214 of the third signal (Block 1214). The multipurpose calibration transceiver 802 may execute a fourth calibration observation 214 of the fourth signal (Block 1216). The telecommunication system 100 may then calibrate the smart antenna array 402 (Block 1218). While four transmitters are described, more than four transmitters with more than four signals may be used.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for digital predistortion, comprising:
executing a first distortion observation of a first signal from a first transmitter of a smart antenna array with a multipurpose calibration transceiver;
digitally predistorting the first signal based upon the first distortion observation;
executing a second distortion observation of a second signal from a second transmitter of the smart antenna array with the multipurpose calibration transceiver;
digitally predistorting the second signal based upon the second distortion observation;
executing a first calibration observation of the first signal and a second calibration observation of the second signal, wherein the calibration observation comprises observing gain and phase differences over transmit and receive paths; and
switching, by the multipurpose calibration transceiver, between the first distortion observation, the second distortion observation, the first calibration observation, and the second calibration observation.

2. The method of claim 1, further comprising:
executing the first calibration observation of the first signal and the second calibration observation of the second signal with the multipurpose calibration transceiver; and
calibrating the first transmitter and the second transmitter.

3. The method of claim 1, further comprising:
executing a third distortion observation of a third signal from a third transmitter of the smart antenna array with the multipurpose calibration transceiver;
digital predistorting the third signal based upon the third observation.

4. The method of claim 1, wherein the first signal and the second signal are time division duplexing signals.

5. The method of claim 1, wherein the first signal and the second signal are frequency division duplexing signals.

6. The method of claim 1, wherein the first signal and the second signal are transmitted using at least one of a long term evolution standard or a WiMax® standard.

7. A telecommunications apparatus using digital predistortion, comprising:
a first transmitter that sends a first signal;
a second transmitter that sends a second signal; and
a multipurpose calibration transceiver that executes a first distortion observation of the first signal to be a basis for a first digital predistortion on the first signal and executes a second distortion observation of the second signal to be a basis for a second digital predistortion on the second signal,
wherein the multipurpose calibration transceiver executes a first calibration observation of the first signal and a second calibration observation of the second signal,
wherein the calibration observation comprises observing gain and phase differences over transmit and receive paths,
wherein the multipurpose calibration transceiver switches between the first distortion observation, the second distortion observation, the first calibration observation, and the second calibration observation.

8. The telecommunications apparatus of claim 7, wherein the multipurpose calibration transceiver executes the first calibration observation of the first signal and the second calibration observation of the second signal to calibrate the first transmitter and the second transmitter.

9. The telecommunications apparatus of claim 7, further comprising:
a third transmitter to transmit a third signal, the third signal digitially predistorted based upon a third distortion observation of the third signal by the multipurpose calibration transceiver.

10. The telecommunications apparatus of claim 7, wherein the first signal and the second signal are time division duplexing signals.

11. The telecommunications apparatus of claim 7, wherein the first signal and the second signal are frequency division duplexing signals.

12. The telecommunications apparatus of claim 7, wherein the first signal and the second signal are transmitted following at least one of a long term evolution standard or a WiMax standard.

13. An electronic device using digital predistortion, comprising:
a first transmitter of a smart antenna array that sends a first signal;
a second transmitter of the smart antenna array that sends a second signal;
a multipurpose calibration transceiver that executes a first distortion observation of the first signal to be a basis for a first digital predistortion on the first signal and executes a second distortion observation of the second signal to be a basis for a second digital predistortion on the second signal,
wherein the multipurpose calibration transceiver executes a first calibration observation of the first signal and a second calibration observation of the second signal,
wherein the calibration observation comprises observing gain and phase differences over transmit and receive paths,
wherein the multipurpose calibration transceiver switches between the first distortion observation, the second distortion observation, the first calibration observation, and the second calibration observation.

14. The electronic device of claim 13, wherein the multipurpose calibration transceiver executes the first calibration observation of the first signal and the second calibration observation of the second signal to calibrate the first transmitter and the second transmitter.

15. The electronic device of claim 13, further comprising:
a third transmitter of the smart antenna array to transmit a third signal, the third signal digitally predistorted based upon a third distortion observation of the third signal by the multipurpose calibration transceiver.

16. The electronic device of claim 13, wherein the first signal and the second signal are time division duplexing signals.

17. The electronic device of claim 13, wherein the first signal and the second signal are frequency division duplexing signals.

18. The electronic device of claim 13, wherein the first signal and the second signal are transmitted following at least one of a long term evolution standard or a WiMax® standard.

* * * * *